United States Patent [19]
Gooderham et al.

[11] Patent Number: 5,390,967
[45] Date of Patent: Feb. 21, 1995

[54] FLEXIBLE VENT PIPE CONNECTOR SYSTEM

[75] Inventors: Wayne R. Gooderham, Bolton; Vasilios Rallis, Barrie; Michael A. Brunt, Toronto, all of Canada

[73] Assignee: Z-Flex, Inc., Richmond Hill, Canada

[21] Appl. No.: 104,802

[22] Filed: Aug. 10, 1993

[51] Int. Cl.[6] .................................................. F16L 25/00
[52] U.S. Cl. ...................................... 285/177; 285/424; 285/331
[58] Field of Search ............... 285/177, 424, 369, 417, 285/331

[56] References Cited

U.S. PATENT DOCUMENTS

| | | | |
|---|---|---|---|
| 216,991 | 7/1879 | Abbott | 285/177 |
| 514,857 | 2/1894 | Laube | 285/177 |
| 1,280,312 | 10/1918 | Scherer | 285/177 |
| 3,873,135 | 3/1975 | Kreitzberg | 285/177 |
| 4,261,600 | 4/1981 | Cassel | 285/177 |
| 4,478,434 | 10/1984 | Little | 285/15 |
| 5,039,137 | 8/1991 | Cankovik | 285/177 X |
| 5,133,579 | 7/1992 | Anderson | 285/424 X |

FOREIGN PATENT DOCUMENTS

| | | | |
|---|---|---|---|
| 549503 | 6/1993 | European Pat. Off. | 285/177 |
| 420057 | 11/1934 | United Kingdom | 285/424 |

OTHER PUBLICATIONS

P. 37 of 1993/1994 Cooperfield Catalog, published Jul. 15, 1993 by Southerland Company, Montezuma, Iowa: Advertisement for B-Vent Adaptor.

*Primary Examiner*—Dave W. Arola
*Attorney, Agent, or Firm*—Daniel J. Bourque; Michael J. Bujold; Anthony G. M. Davis

[57] ABSTRACT

A connector system for coupling first and second venting devices, at least one of which comprises a flexible vent pipe, includes a venting device connector having first and second ends. A first end of the venting device connector includes an inner vent member having an outside diameter smaller than the inside diameter of the flexible pipe to which it is to be coupled. An outer flexible vent pipe restraining member circumferentially surrounds an end portion of the inner vent member and has an inside diameter substantially larger than the inner vent member, and generally larger than the outside diameter of a grooved exterior region of the flexible vent pipe to which the connector is to be coupled. A circumference reducer allows the first end of the venting device connector to be securely and releasably attached to the flexible vent pipe. A second end of the venting device includes a venting device engaging member which is in fluid communication of the inner vent member of the first end of the venting device, for engaging with the other venting device, and for securely coupling the first and second venting devices in fluid communication, for allowing venting of gases from one of the first and second venting devices to the other.

18 Claims, 4 Drawing Sheets

FLEXIBLE VENT PIPE CONNECTOR SYSTEM

FIELD OF THE INVENTION

This invention relates to venting systems such as required for heating appliances and more particularly, to a connector system for coupling single and double wall insulated flexible vent pipes to heating appliances and other types of venting devices or vent pipes.

BACKGROUND OF THE INVENTION

Since the passage of federal regulations requiring increased energy efficiency in all types of energy consuming devices, particularly heating appliances such as furnaces, manufacturers of SUCH devices have constantly improved and increased the efficiency of these devices to a point where less and less energy escapes the heating appliance through the venting gases. This reduction in temperature in the escaping vent gases has caused a corresponding increase in venting system problems such as poor draft due to the low heat in the venting system, and condensation in the venting system which causes corrosion of the venting system whether it be metal, brick or other type.

Accordingly, many improvements in venting systems have been developed in an effort to combat and reduce these problems. One of the principle developments has been the provision, by many manufacturers, of insulated vent pipe. This insulated vent pipe serves two purposes; First, to allow the inner pipe to remain warm enough to provide an adequate draft for the appliance, while also maintaining sufficient heat in the pipe to avoid condensation and the resultant corrosion problems.

A second benefit of some insulated vent pipes is the ability to utilize these vent pipes in a closed space, such as walls, ceilings, attics and crawl spaces, by reducing the clearance required between the exterior wall of the insulated vent pipe and surrounding combustible materials. One such manufacturer of insulated pipe is Z-Flex (U.S.) Inc. which manufacturers "B-Vent" type of insulated vent pipe.

Many of these vent pipes, however, are designed only for vertical use as chimney replacements and accordingly, an additional market has emerged for various manufacturers to provide insulated vent pipes that are designed to be orientated or installed horizontally, such as required when connecting the heating appliance such as a furnace or hot water heater to the vertically installed insulated vent pipe.

The result has been an increase in the number of manufacturers providing vertically installable venting systems or metal chimney liners, and an additional number of different manufacturers providing horizontally installable venting system components to connect with the vertical components or chimney liners.

Accordingly, a heating appliance installer or heating appliance part distributer must have on hand a large number of venting system connectors to allow the installer to connect an appliance with one manufacturer's horizontal or connecting vent pipe which in turn must be connected with another manufacturer's or other type of vertical venting system, chimney liner or chimney flue. The requirement to have available and in stock such a large number of connectors often results in the installer not having the proper part and/or the distributor not stocking the correct connector.

A further problem has arisen in that recently, manufacturers have begun providing the horizontally installed or connecting segment of the venting system in a flexible type pipe. This allows the installer to utilize fewer connectors given that the flexible pipe can be bent, to some degree, to minimize alignment problems between a heating appliance and the remainder of the venting system.

In order to connect the heating appliance and venting system to such flexible pipe, however, an additional number of connectors must be provided. Further, given the construction of flexible pipe and the fact that this type of pipe typically comes in longer sections and is cut to length, leaving grooves or ridges to the end of the pipe in the connector attachment area, this type of pipe is difficult to permanently engage with a connector and often requires the installer to utilize time consuming efforts, such as installing a number of screws, to connect the flexible pipe to the connector, to ensure the permanency and safety of this connection.

Accordingly, what is required is a connector system which minimizes the number of connectors required to couple flexible vent pipe with other venting devices, such as heating appliances, chimney liners and vertically installed venting systems, to name but a few; and which preferably provides for a universal connector which can couple a flexible, insulated vent pipe to a number of other venting devices.

SUMMARY OF THE INVENTION

The present invention features a connector system for coupling first and second venting devices which are to be coupled together, such as flexible and non-flexible, single wall vent pipe; flexible and non-flexible insulated, double walled, vent pipe; gas generating heating appliances; chimney liners and vent pipe connectors. At least one of the first and second venting devices comprises a flexible vent pipe.

The flexible vent pipe includes a coupling region for engaging with the connector system. The coupling region includes a grooved exterior region having a predetermined outside diameter and a grooved interior region having a predetermined inside diameter.

The connector system further includes a venting device connector having first and second ends. The first end of the venting device connector is coupled to the coupling region of the flexible vent pipe, while the second end of the venting device connector is coupled to a first end of the other of said first and second venting devices.

The first end of the venting device connector includes an inner, generally circular shaped, vent member including an end portion having a predetermined outside diameter which is generally smaller than the predetermined inside diameter of the grooved interior region of the flexible vent pipe coupling region. The first end of the venting device connector also includes an outer, generally circular shaped, flexible vent pipe restraining member which is coupled to a central region of the inner vent member of the first end of the venting device connector. The outer, flexible vent pipe restraining member circumferentially surrounding at least the end portion of the vent member of the first end of the venting device connector, and having an inside diameter substantially larger than an outside diameter of the inner vent member and generally larger than the outside diameter of the grooved exterior region of the flexible vent pipe coupling region.

The outer, flexible vent pipe restraining member also forms an annular shaped, flexible vent pipe receiving region circumferentially surrounding at least the end portion of the inner, generally circular shaped vent member, the flexible vent pipe receiving region providing an area into which the flexible vent pipe may be inserted.

The flexible vent pipe restraining member further includes a circumference reducer, for reducing the circumference of the outer, flexible vent pipe restraining member and of the annular shaped, flexible vent pipe receiving region, for engaging and restraining the grooved interior and exterior regions of the flexible vent pipe coupling region between the inner vent member and the outer restraining member of the first end of the venting device connector. In the preferred embodiment, the circumference reducer includes a clamping device, such as a gear clamp.

The second end of the venting device connector includes a generally circularly shaped vent member including an end portion having a predetermined outside diameter. The vent member of the second end of the venting device connector, is coupled to and in fluid communication with the inner vent member of the first end of the venting device connector for allowing venting of gases from one of the first and second venting devices to the other. The second end of the venting device connector is adapted for engaging with the other of said first and second venting devices, for securely coupling the first and second venting devices in fluid communication. In the preferred embodiment, the connector system is fabricated from aluminum and adapted to vent gases from a gas fired heating appliance, although gases from oil and other fuel type heating appliances may be vented by providing a venting device connector made from appropriate material such as stainless steel.

In a first embodiment, the second end of the venting device connector further includes an outer, generally circularly shaped, venting device restraining member circumferentially surrounding at least the end portion of the inner vent member and forms an annular shaped, flexible vent pipe receiving region circumferentially surrounding at least the end portion of the inner vent member. In this embodiment, the second end further includes a circumference reducer on the outer restraining member, for releasably and adjustably reducing the circumference of the restraining member on the second end of the venting device, for engaging and restraining the other of said first and second venting devices.

In the first embodiment, the second end of the venting device connector is adapted to be coupled to one predetermined type of venting device including a heating appliance; a double walled, insulated, non-flexible vent pipe; a double walled, non-insulated, non-flexible vent pipe; a double walled, insulated, flexible vent pipe; a single wall, flexible vent pipe; a single wall, non-flexible vent pipe and a single wall vent pipe connector. In a second embodiment, the second end of the venting device connector is adapted to be coupled to any one of a number of venting devices from the list enumerated above, thus forming a universal flexible vent pipe connector.

DESCRIPTION OF THE DRAWINGS

These, and other features and advantages of the present invention will be better understood by reading the following detailed description, taken together with the drawings wherein.

DETAILED DESCRIPTION OF THE INVENTION

Figure 1:
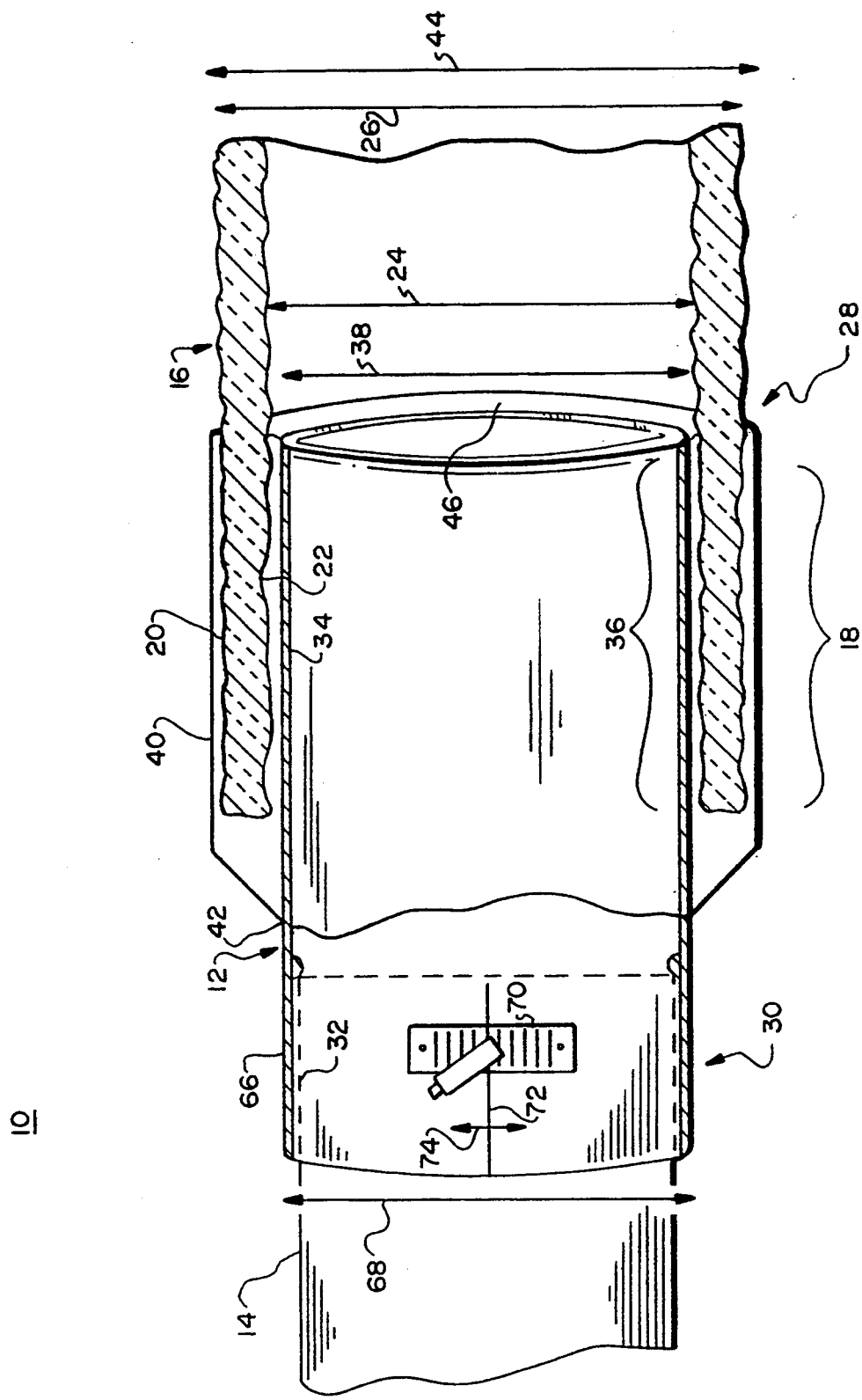
FIG. 1 is a cross-sectional view of a first embodiment of a venting device connector system of the present invention.

The present invention features a connector system 10, for coupling first and second venting devices. The connector system includes a venting device connector 12 for coupling first and second venting devices 14, 16. At least one of the venting devices, in this example, the second venting device 16, comprises a flexible vent pipe of the type capable of being bent to align the vent pipe with a heating appliance, venting system, or other type of venting connector. Such flexible vent pipe may be either single wall, non-insulated, flexible vent pipe or an insulated, dual wall, vent pipe, as shown for exemplary purposes. Such flexible vent pipe is available from Z-Flex U.S., Inc. known as Z-Flex pipe.

The flexible vent pipe 16, whether of single wall or double wall construction, includes a coupling region 18 to which the venting device connector must be attached. The flexible vent pipe, in the coupling region 18, includes a grooved exterior region 20 and a grooved interior region 22. The grooved interior region 22 of the flexible vent pipe 16 defines a predetermined inside diameter 24 of at least the coupling region, while the grooved exterior region 20 establishes or defines a predetermined outside diameter in the coupling region which is illustrated by arrow 26.

Accordingly, the venting device connector 12 includes a first end 28 and a second end 30. In this example, the first end 28 of the venting device connector 12 is coupled to the coupling region 18 of the flexible vent pipe 16, while the second end 30 of the venting device connector is coupled to a first end 32 of the second venting device 14.

The first end 28 of the venting device connector 12 includes an inner, generally circularly shaped, vent member 34 including at least an end portion 36 approximately corresponding in length to the coupling region 18 of the flexible vent pipe 16. The inner vent member 34 has an outside diameter indicated generally by arrow 38 which is smaller than the predetermined inside diameter 24 of the grooved interior region 22 of the flexible vent pipe coupling region 18.

The first end 28 of the venting device connector 12 also includes an outer, generally circularly shaped, flexible vent pipe restraining member 40. The flexible vent pipe restraining member 40 is coupled proximate a central region 42 of the inner vent member 34 of the venting device connector 12. The outer flexible vent pipe restraining member circumferentially surrounds at least the end portion 36 of the inner vent member and includes an inside diameter 44 which is generally larger than the outside diameter 26 of the grooved exterior region 20 of the flexible vent pipe coupling region 18, and substantially larger than the outside diameter 38 of the inner vent member 34. In addition, the flexible vent pipe restraining member forms an annular shaped flexible vent pipe receiving region 46 which circumferentially surrounds at least the end portion 36 of the inner vent member 34.

The annular shaped, flexible vent pipe receiving region 46 provides a region into which the flexible vent pipe, whether single or double walled, may be inserted into the first end 28 of the venting device connector 12. In a preferred embodiment, a first venting device connector is constructed specifically for connection with a single wall, non-insulated, flexible vent pipe by designing the annular shaped, flexible vent pipe receiving region 46 to have a radius of approximately ¼ inch, while a second venting device connector is provided with a flexible vent pipe receiving region 46 having a radius of approximately ⅜ inch, to facilitate a double wall, insulated, flexible vent pipe.

Figure 2:
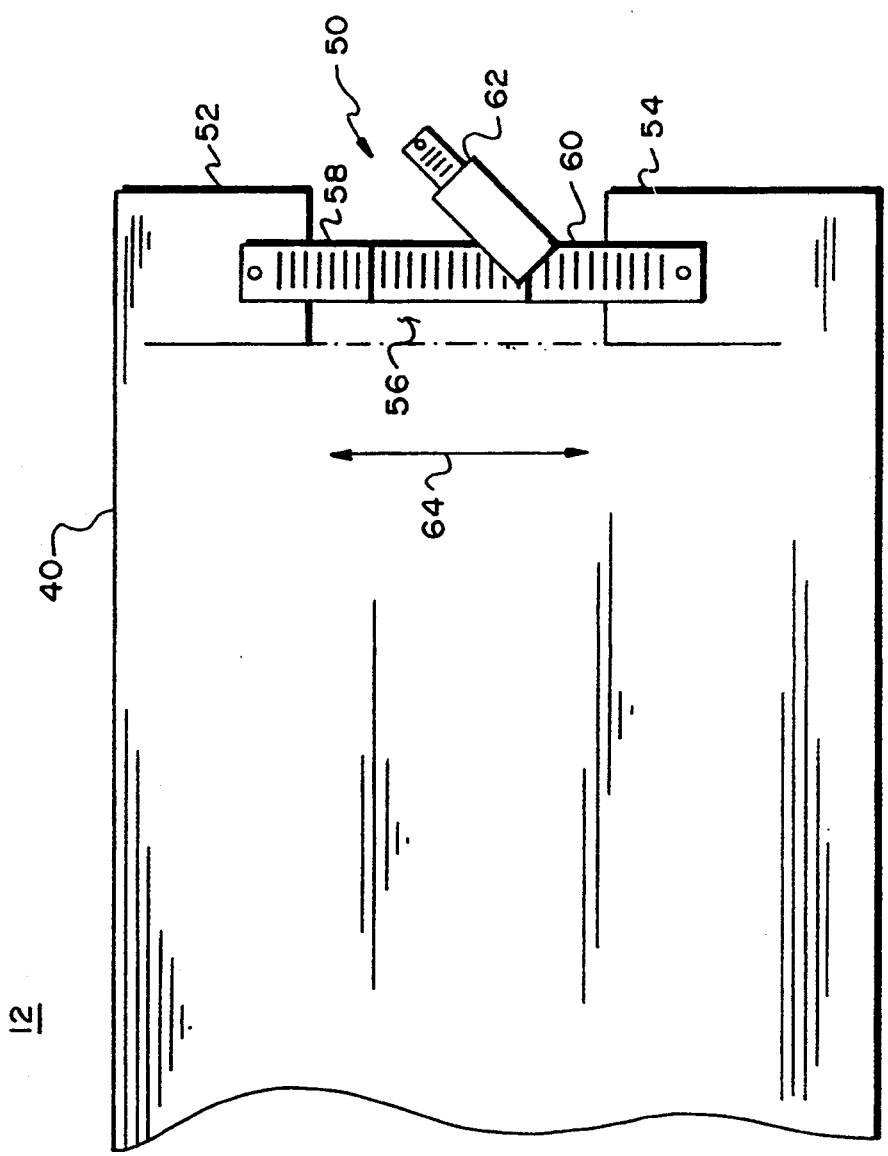
FIG. 2 is a side view of one embodiment of the circumference reducer of the connector system according to the present invention.

As shown in greater detail in FIG. 2, the flexible vent pipe restraining member 40 of at least the first end of the venting device connector 12 includes a circumference reducer 50 comprising, in one embodiment, of first and second tabs 52, 54, formed by a cutout region 56 in the end portion of the flexible vent pipe restraining 40. The first and second tabs 52, 54, are joined by first and second strips 58, 60, of clamp forming material having a number of spaced segments for engaging with a gear clamp 62, as well known to those skilled in the art. Gear clamp 62 may comprise a traditional gear clamp or a quick release gear clamp, also known to those well skilled in the art.

Accordingly, by tightening and releasing the gear clamp 62, the circumference of the flexible vent pipe restraining member 40 in the region in which the flexible vent pipe engages with the first end of the venting device connector can be adjusted to reduce the circumference to engage the flexible vent pipe between the outer flexible vent pipe restraining member and the inner vent member, to secure the flexible vent pipe to the first end of the venting device connector. The gear clamp 62 is also utilized to increase the circumference of the outer flexible vent pipe restraining member to allow the vent pipe to be disengaged with the venting device connector 12. Accordingly, the circumference reducer operates by moving tabs 52, 54 in or out in a direction indicated generally by arrow 64.

Returning to FIG. 1, the second end 30 of the first embodiment of the connector system of the present invention includes a generally circular shaped inner venting device engaging member 66 including an end portion having a predetermined outside diameter indicated generally by arrow 68. In the exemplary venting device connector shown in FIG. 1, the venting device engaging member 66 of the second end 30 of the venting device connector 12 has an inside diameter which is larger than the outside diameter of the venting device 14 and thus slides over the venting device 14. In this example, the venting device 14 may be an outlet of a heating appliance such as a hot water heater or furnace, and thus, flexible vent pipe may be easily and securely connected to the heating appliance.

In the preferred embodiment of this exemplary connector, the second end 30 of the venting device connector 12 also includes a circumference reducer 70 comprised of a gear clamp spanning an overlapping region or slit 72 in the venting device engaging member 66, which thus allows the circumference of the venting device engaging member 66 of the second end of the venting device connecting member to be adjusted as shown by arrows 74, to securely attach the second end of the venting device connector to the other venting device 14.

The venting device connector 12 of the present invention may be fabricated from aluminum of approximately 24 gauge. Alternatively, the venting device connector may be fabricated from other materials such as steel or plastic, of corresponding appropriate thickness, depending upon the application. The venting device connector system of the present invention is adapted for venting exhaust gases from mid-efficiency gas or oil fired heating equipment, although they may be utilized in other similar applications.

Figure 3:
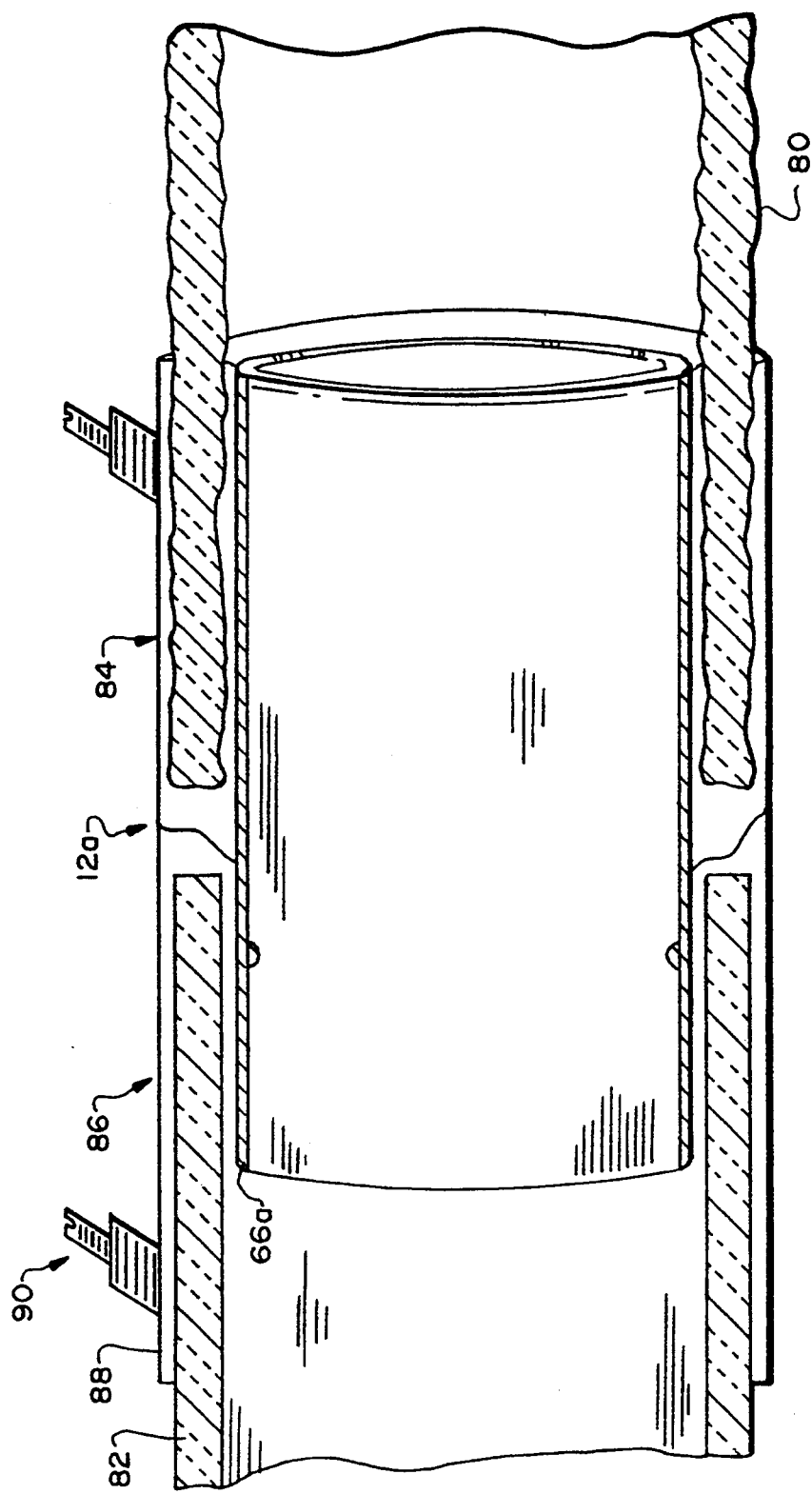
FIG. 3 is a cross-sectional view of a second embodiment of the connector system of the present invention wherein the second end of the venting device connector is adapted to connect with one predetermined type of rigid, insulated, venting device.

A second embodiment of a venting device connector 12a is shown in FIG. 3 which is adapted to connect a flexible vent pipe 80 (insulated or uninsulated) with an insulated, rigid pipe 82 commonly known as "B-Vent". In this embodiment, the first end 84 of the venting device connector 12a is as previously described while second end 86 includes, in addition to the inner venting device engaging member 66a, an outer, generally circular shaped venting device restraining member 88 also including a circumference reducer 90 including a gear-type clamp as previously described.

Figure 4:
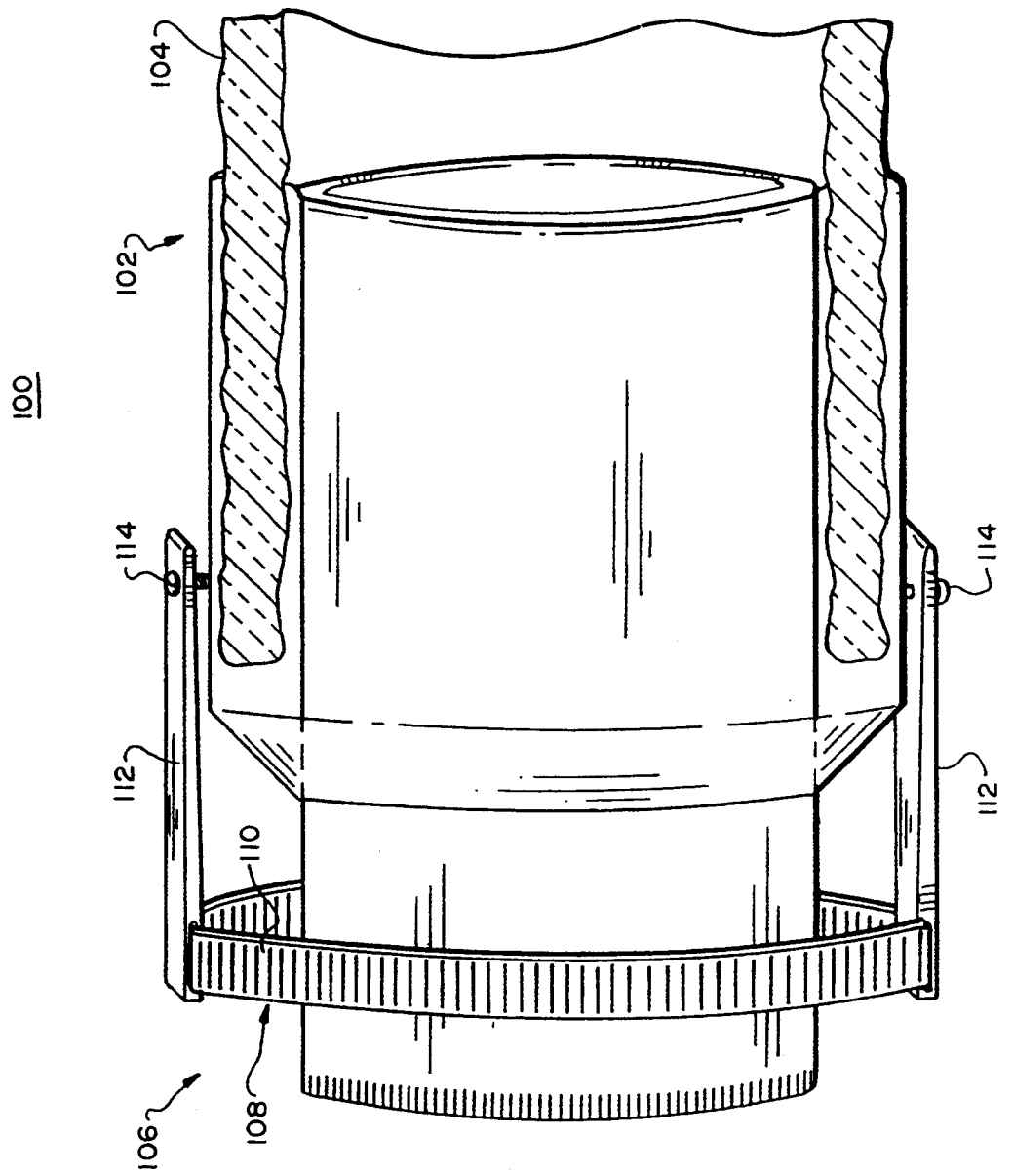
FIG. 4 is a side view of another embodiment of the connector system of the present invention illustrating a universal venting device connector.

Yet another and preferred embodiment of a venting device connector which forms part of the connector system of the present invention is shown in FIG. 4 as a universal venting device connector 100 including a first end 102 which couples the connector 100 to a flexible vent pipe 104, typically an insulated vent pipe although an embodiment coupling the connector to a non-insulated vent pipe is also considered to be within the scope of the present invention.

The second end 106 of the venting device connector 100 is differentiated from the prior embodiments in that the outer, generally circular shaped venting device restraining member 108 is formed utilizing a gear clamp strap 110 passing through a plurality of supports 112 spaced about the circumference of the venting device connector 100. In the preferred embodiment, three supports 112 are spaced approximately 120 degrees apart around the circumference of the venting device. A gear clamp (not shown) couples the two ends of the gear clamp strap 110. The outer, venting device restraining member spacers 112 are constructed of flexible aluminum, stainless steel, or other similar material such as utilized to manufacture the connector itself, and are attached by fastening means 114 such as rivets, welding, etc. to the outer periphery of the venting device connector. The flexible nature of the gear clamp strap supports 112 allows them to easily adjust inward and outwardly, to attach to almost any type of venting device to which the user wishes to attach the universal connector.

Accordingly, some of the venting devices to which the universal connector 100 according to this embodiment of the present invention may attach includes rigid or flexible insulated pipe, including "B-Vent" type vent pipe; flexible or rigid, non-insulated vent pipe; chimney venting systems; chimney liners; and other types of connectors. The universal nature of the connector of this embodiment of the present invention provides a heating appliance installer and parts distributer with a truly universal connector thus minimizing the number of connectors that the installer or distributer must have on hand.

Modifications and substitutions by one of ordinary skill in the art are considered to be within the scope of the present invention which is not to be limited except by the claims which follow.

We claim:

1. A connector system for coupling first and second venting devices, at least one of said first and second venting devices comprising a flexible vent pipe, said connector system comprising:

first and second venting devices to be coupled together, at least one of said first and second venting devices comprising a flexible vent pipe including a coupling region for engaging with a venting device connector, said coupling region having a grooved exterior region having a predetermined outside diameter and a grooved interior region, having a predetermined inside diameter;

a venting device connector having first and second ends, said first end of said venting device connector coupled to said coupling region of said flexible vent pipe, said second end of said venting device connector coupled to a first end of the other of said first and second venting devices;

said first end of said venting device connector including:

an inner, generally circular shaped, vent member including an end portion having a predetermined outside diameter which is generally smaller than said predetermined inside diameter of said grooved interior region of said flexible vent pipe coupling region;

an outer, generally circular shaped, flexible vent pipe restraining member, said flexible vent pipe restraining member coupled proximate a central region of said inner vent member of said venting device connector, said outer flexible vent pipe restraining member circumferentially surrounding at least said end portion of said inner vent member, and having an inside diameter substantially larger than an outside diameter of said inner vent member, and generally larger than said outside diameter of said grooved exterior region of said flexible vent pipe coupling region, said outer, flexible vent pipe restraining member forming an annular shaped flexible vent pipe receiving region circumferentially surrounding at least said end portion of said inner, generally circular shaped, vent member; and said flexible vent pipe restraining member further including a circumference reducer mechanism releasably and adjustably reducing the circumference of said outer flexible vent pipe restraining member and said annular shaped, flexible vent pipe receiving region, for engaging and restraining said grooved interior and exterior regions of said flexible vent pipe coupling region between said inner vent member and said outer flexible vent pipe restraining member of said first end of said venting device connector; and said second end of said venting device connector including a generally circular shaped venting device engaging member including an end portion having a predetermined outside diameter, said venting device engaging member of said second end of said venting device connector coupled to and in fluid communication with said inner vent member of said first end of said venting device connector, said second end of said venting device connector coupled to said first end of the other of said first and second venting devices, for securely coupling said first and second venting devices in fluid communication, for allowing venting of gases from one of said first and second venting devices to the other.

2. The connector system of claim 1, wherein said second end of said venting device connector further includes a circumference reducer mechanism, for releasably and adjustably reducing a circumference of said second end of said venting device connector, for engaging and restraining said other of said first and second venting devices to said second end of said venting device connector.

3. The connector system of claim 2, wherein said circumference reducer mechanism of said first and said second end of said venting device connector is selected from the group consisting of:

a gear clamp, and a quick release gear clamp.

4. The connector system of claim 2, wherein said circumference reducer mechanism of said first and said second end of said venting device connector further includes one of:

a longitudinal slit in said venting device restraining member of at least one of said first and second ends of said venting device, said longitudinal slit aligned perpendicular to the circumference of said generally circular shaped, restraining member; and a circumferentially aligned slit in said restraining member, said circumferentially aligned slit formed by first and second tab portions, said first and second tab portions coupled by said circumference reducer mechanism, for reducing the circumference of said restraining member.

5. The connector system of claim 2, wherein said second end of said venting device connector includes an outer, generally circularly shaped, venting device restraining member having an inside diameter substantially larger than the outside diameter of said inner, venting device engaging member, and generally larger than an outside diameter of said other of said first and second venting devices, said outer venting device restraining member forming an annular shaped venting device receiving region circumferentially surrounding at least said end portion of said inner, generally circular shaped, venting device engaging member.

6. The connector system of claim 5, wherein said circumference reducer mechanism of said second end of said venting device connector is disposed on said generally circular shaped venting device restraining member of said second end.

7. The connector system of claim 5, wherein said second end of said venting device connector is coupled to said first end of said other of said first and second venting devices of one predetermined type selected from the group consisting of:

a heating appliance; a double walled, insulated, non-flexible vent pipe; a double walled, non-insulated, non-flexible vent pipe; a double walled, insulated, flexible vent pipe; a single wall, flexible vent pipe; a single wall, non-flexible vent pipe; and a single wall vent pipe connector.

8. The connector system of claim 5, wherein said second end of said venting device connector is coupled to said first end of one venting device selected from the group consisting of:

a double walled, insulated, non-flexible vent pipe; a double walled, non-insulated, non-flexible vent pipe; a double walled, insulated, flexible vent pipe; a single wall, flexible vent pipe; a single wall, non-flexible vent pipe; and a single wall vent pipe connector.

9. The connector system of claim 1, wherein said flexible vent pipe is insulated.

10. The connector system of claim 1, wherein said flexible vent pipe is non-insulated.

11. The connector system of claim 1, wherein said first and second venting devices are coupled for allowing the venting of combustion of gases from a gas fired appliance.

12. The connector system of claim 1, wherein said first and second venting devices are coupled for allowing the venting of combustion of gases from an oil fired appliance.

13. A venting device connector for coupling first and second venting devices together, at least one of said first and second venting devices comprising a flexible vent pipe, said venting device connector comprising:

a first end and a second end;

said first end of said venting device connector including:

an inner, generally circular shaped, vent member including an end portion having a predetermined outside diameter which is generally smaller than a predetermined inside diameter of a first end of said flexible vent pipe;

an outer, generally circular shaped, flexible vent pipe restraining member, said flexible vent pipe restraining member coupled proximate a central region of said inner vent member of said venting device connector, said outer flexible vent pipe restraining member circumferentially surrounding at least said end portion of said inner vent member, and having an inside diameter substantially larger than an outside diameter of said inner vent member, and generally larger than a predetermined outside diameter of said first end of said flexible vent pipe, said outer, flexible vent pipe restraining member forming an annular shaped flexible vent pipe receiving region circumferentially surrounding at least said end portion of said inner, generally circular shaped, vent member; and said flexible vent pipe restraining member further including a circumference reducer mechanism releasably and adjustably reducing the circumference of said outer flexible vent pipe restraining member and said annular shaped, flexible vent pipe receiving region, for engaging and restraining said first end of said flexible vent pipe between said inner vent member and said outer flexible vent pipe restraining member of said first end of said venting device connector; and said second end of said venting device connector including a generally circular shaped venting device engaging member including an end portion having a predetermined outside diameter, said venting device engaging member of said second end of said venting device connector coupled to and in fluid communication with said inner vent member of said first end of said venting device connector, said second end of said venting device connector configured for engaging with the other of said first and second venting devices, for securely coupling said first and second venting devices in fluid communication, for allowing venting of gases from one of said first and second venting devices to the other.

14. The venting device connector of claim 13, wherein said second end of said venting device connector further includes a circumference reducer mechanism releasably and adjustably reducing a circumference of said second end of said venting device connector, for engaging and restraining said other of said first and second venting devices to said second end of said venting device connector.

15. The venting device connector of claim 14, wherein said circumference reducer mechanism of said first and said second end of said venting device connector includes a gear clamp.

16. The venting device connector of claim 14, wherein said circumference reducer mechanism of said first and said second end of said venting device connector includes a quick release gear clamp.

17. The venting device connector of claim 14, wherein said circumference reducer mechanism of said first and said second end of said venting device connector further includes a longitudinal slit in said venting device restraining member of at least one of said first and second ends of said venting device, said longitudinal slit aligned perpendicular to the circumference of said generally circular shaped, restraining member.

18. The venting device connector of claim 14, wherein said circumference reducer mechanism of said first and said second end of said venting device connector further includes a circumferentially aligned slit in said restraining member, said circumferentially aligned slit formed by first and second tab portions, said first and second tab portions coupled by said circumference reducer mechanism, for reducing the circumference of said restraining member.

* * * * *